United States Patent [19]
Moard et al.

[11] Patent Number: 5,441,546
[45] Date of Patent: Aug. 15, 1995

[54] APPARATUS AND METHOD FOR DECREASING NITROGEN OXIDE EMISSIONS FROM INTERNAL COMBUSTION POWER SOURCES

[76] Inventors: David Moard; Leonard Greiner, both of 1310 Logan Ave., Suite E, Costa Mesa, Calif. 92626-4023

[21] Appl. No.: 148,472

[22] Filed: Nov. 8, 1993

[51] Int. Cl.⁶ .................................................. C10G 9/04
[52] U.S. Cl. ........................................ 48/107; 431/210; 48/102 A; 48/61
[58] Field of Search ...................... 48/107, 102 A, 113, 48/61; 431/210

[56] References Cited

U.S. PATENT DOCUMENTS

| | | | |
|---|---|---|---|
| 3,516,807 | 6/1970 | West et al. | 48/107 |
| 3,685,977 | 8/1972 | Goodman | 48/107 |
| 5,002,481 | 3/1991 | Forster | 431/210 |

*Primary Examiner*—Carroll B. Dority
*Attorney, Agent, or Firm*—Albert M. Herzig

[57] ABSTRACT

Apparatus is disclosed herein for reducing engine nitrogen oxide emissions by mixing hydrogen prepared from a portion or all of engine fuel within a simple burner. The apparatus includes an insulated burner having an internal combustion chamber for receiving either a portion of or all the gaseous fuel or liquid fuel for mixture with air and subsequent ignition by a spark plug. The chamber is within a feed preheater assembly. A mixing chamber is included having a series of baffles against which injected air and fuel vapor impinge causing thorough and complete air/fuel blending into a mixture subsequently ignited and burned, and then discharged into the combustion chamber of the engine itself. The pre-heating assembly raises the temperature of the incoming air/fuel mixture via a heat exchanging process with post combusted gases from the combustion chamber. The apparatus improves operability and performs by conserving energy by insulating the total burner, placing the burner section within the feed preheater assembly, and locating the feed mixture flow of the preheater adjacent to the outer insulation; and hydrogen output may be increased by reaction between carbon monoxide and water produced by the main reaction or added separately.

7 Claims, 4 Drawing Sheets

APPARATUS AND METHOD FOR DECREASING NITROGEN OXIDE EMISSIONS FROM INTERNAL COMBUSTION POWER SOURCES

BACKGROUND OF THE INVENTION

1. Field of the Invention

The present invention relates to the field of reducing nitrogen oxide emission from internal combustion engines and turbines, and more particularly to a novel means and method for conducting a feed mixture flow from a preheater assembly to a fully insulated burner having an insulated inner burner supplying gases from a portion or part of the main engine fuel whether it be gaseous or liquid to an insulated outer burner.

2. Brief Description of the Prior Art

It is well known that nitrogen oxides ($NO_x$) form at the high temperatures normally associated with combustion processes and that operating an engine at lean conditions with excess air lowers temperature and, therefore, decreases $NO_x$. However, decades of engine and turbine studies have shown that lean combustion limits are above those where $NO_x$ emissions are below specified goals. Natural gas and gasoline are examples where lean combustion has been pushed to its limit and where it has been found that hydrogen addition increases this limit to where $NO_x$ output is acceptably low. However, means to obtain hydrogen for this purpose are beset with problems.

Problems and difficulties have been encountered when the supply of hydrogen is provided by materials carried in a separate tank which can be extremely heavy and requires pressurization. As examples, methanol, hydrogen or ammonium nitrate can provide or produce hydrogen when added to an engine combustor. However, these take the place of the fuel and so reduce the volumetric storage capacity which lowers overall performance, and results in complications through use of secondary materials. Hydrogen stored in the pressurized container which holds methane (Hythane) can also be used, but this causes about 0.75 percent reduced engine range for each percent hydrogen used because of its very low energy content on a volumetric basis, and also requires special means to enable safe storage of hydrogen.

The present invention teaches the use of an underoxidized burner using the main fuel to obtain hydrogen.

Previous attempts have been made to improve the underoxidized burner disclosed in the applicants' two previous patent applications by pre-mixing fuel and air, pre-heating the fuel-air feed by heat exchange with the burner products, and affecting circulation of the burning products. Such prior attempts have been successful in reducing nitrogen oxide emission. Thus, the two stage burner described in the first disclosure utilizes technology to effect chemical equilibration with air-fuel formulations containing a great excess of fuel and a second stage in the prior disclosures utilizes related technology to attempt equilibration between the products of the first stage and excess air.

Conventional burners operate air rich and react in roughly two stages. The first stage includes regions with air-fuel ratios near stoichiometric wherein high temperatures occur that induce initiating undesired chemical reaction with the fuel. Such temperatures result in elevated concentrations of $NO_x$. A second stage operates air rich to achieve final overall air-fuel ratio. Its temperature is lower but not sufficiently low that $NO_x$ cannot form, and this stage generally does not remove $NO_x$ which has been formed in the first stage. The overall result is that $NO_x$ formed in both stages appears in the burner exhaust.

In the second previous patent application mentioned above, technology is disclosed for attaining chemical equilibration between air and a large excess of fuel in an underoxidized burner through a process whereby the air-fuel mixture undergoes certain rapid flow reversals. This technology results in equilibration at a reasonably high temperature without resulting in formation of $NO_x$ since its excessive fuel concentration preferentially causes reaction between air and fuel instead of air and $N_3$ to form $NO_2$.

It has been found that the technology of U.S. Pat. Nos. 5,207,185 and 5,299,536 results in products that are easily combusted with further air. As a consequence, a combustor with excess air for powering engines which products virtually zero $NO_x$ can be achieved by a related two-stage process. The first stage comprises a fuel-rich burner of the type taught in these co-patents. The second stage uses similar technology but operates air rich. Products from the first stage and the excess air needed to attain the final air-fuel mixture are introduced into the second stage. In this stage, a mixture of the latter air and latter products undergoes the same rapid flow reversals taught by the technology of the co-patents, which result in their rapid chemical equilibration. In view of the improved reactivity of the fuel products obtained from the underoxidized burner, the induced flow reversals, and the relatively high concentration of hydrogen, equilibration can be induced in the second stage at a higher ration of air-fuel than normally used. This results in very low temperatures where $NO_x$ formation is very low.

The technology of the co-patents results in an underoxidized burner replacing the customary near-stoichiometric regions in the first stage of a burner. While the latter produces $NO_x$ that eventually appears in the exhaust, $NO_x$ cannot form in the very fuel rich underoxidized burner. It equilibrates instead to easily combustible CO and $H_2$, and very minor amounts of undecomposed fuel. As a consequence, injecting a mix of such products and the air needed to attain the desired overall air-fuel ration into a second stage burner which incorporates means to achieve the same rapid flow reversals taught by the co-patents, results in rapid chemical equilibration. These factors, aided by the relatively high concentration of $H_2$, permits stable combustion at extraordinarily lean air/fuel ration with relatively low temperature where $NO_x$ does not form.

Therefore, a long-standing need has existed to provide novel means and methods for accomplishing a technology breakthrough for a simple means of producing hydrogen from fuel in a simple fully insulated burner without the catalyst and without a special pressurized hydrogen or related storage means heretofore normally considered required and whereby improved results are gained employing first and second stages which are virtually $NO_x$ free, as is the overall combustor, leading to a no-$NO_x$ burner.

SUMMARY OF THE INVENTION

Accordingly, the above problems and difficulties are avoided by the present invention which provides a novel means and method utilizing a fully insulated burner for combusting air and hydrocarbons at fuel-rich stoichiometric air/fuel ratios from 0.3 to 1, which includes a first stage burner having a combustion chamber properly coupled to a main source of fuel which includes means for diverting a portion of the main fuel into the burner along with a portion or all of the main air so that the fuel portion and air portion impinge against a first baffle arrangement whereby impingement thoroughly mixes the fuel/air combination preparatory for ignition in the combustion chamber. Means are provided for exhausting the burned gashes from the first stage burner into the combustion chamber of a second stage burner via a second baffle arrangement and then into exhaust. The excellent mixing provided by said impingements results in close to theoretical equilibration of the fuel-rich reaction, despite the low reactivity of the original excess fuel.

Therefore, it is a primary object of the present invention to provide a novel fully insulated burner means having means for intimate pre-mixing of fuel and a deficiency of air which is achieved by bringing the air and fuel together in a first separate chamber and then to a second chamber where the flow is induced to move back and forth via a series of baffle assemblies in each of the chambers preparatory for entering the combustion chamber where ignition of the mixture occurs.

Yet another object is to provide a novel burner apparatus means and method which is a very simple, non-catalytic burner means and method for producing hydrogen from a portion or all of the main engine fuel for injection into the main engine combustor with the remainder of the fuel or full fuel flow to attain high air/fuel ratios leading to minimal or zero nitrogen oxide formation.

A still further object of the present invention is to provide a hydrogen generator for use in connection with reducing nitrogen oxide in an engine emission which does not require additives that degrade fuel performance and which burner contributes little to engine complexity.

Yet another object of the present invention is to provide a novel means and apparatus and method utilizing a two-stage fully insulated burner to reduce nitrogen oxides from internal combustion engines and turbines by utilization of a simple hydrogen generator fed by a small portion or all of main engine fuel whereby the resultant hydrogen produced is to be co-fired or flowed in the engine with the remainder of the main fuel, or as the fuel.

A further object resides in the provision of an air/fuel mixture pre-heating means and methodology so as to provide a higher combustion temperature to assist the equilibration process.

Another object resides in employment of an insulated burner with preferably two fuel-air mixing chambers to insure vaporization of liquid fuel with increased hydrogen output.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
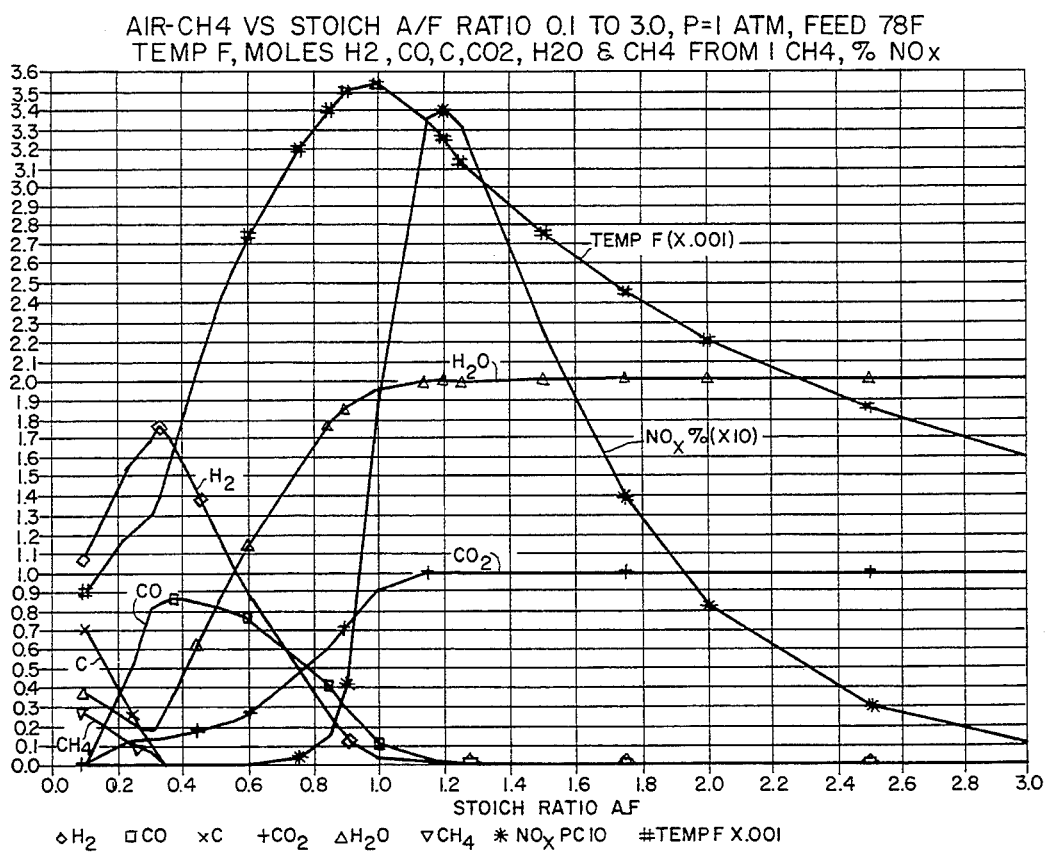
FIG. 1 is a chart of theoretical equilibrium calculations for methane-air combinations.

In conventional burners, as shown in FIG. 1, ratios of air (formulas $O_2 + 3.76\ N_2$) to fuel are set with more than sufficient oxygen ($O_2$) to react all carbon (C) atoms to carbon dioxide ($CO_2$) and all hydrogen (H) to water ($H_2O$). With methane ($CH_4$) as fuel, this is represented by the equations,

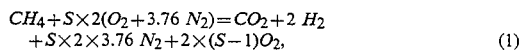

$$CH_4 + S \times 2(O_2 + 3.76\ N_2) = CO_2 + 2\ H_2 + S \times 2 \times 3.76\ N_2 + 2 \times (S-1)O_2, \qquad (1)$$

where S, the air/fuel "stoichiometric ratio", is unity when there are just sufficient oxygen atoms to react with all fuel atoms. State-of-the-art burners used, for example, with engines normally operate with S greater than one, with excess air molecules ($O_2$ and $N_2$) emerging relatively unchanged, except that at high temperatures excessive concentrations of $NO_x$ form which are difficult to dissociates to elements. This is undesirable pollutant.

Results of theoretical equilibrium calculations for methane-air combinations are assembled in FIG. 1 for air/fuel S from 0.1 to 3.0, reaction at one atmosphere, and feed at 78° F. Species are given as moles of product per mole of methane feed vs. S, except $NO_x$ is volume percent times 10. Temperature is in deg F divided by 1000. Virtually all potential products are included in the calculations. However, $N_2$ is excluded because it exceeds the orinate; it can be calculated from $S \times 2 \times 3.76$.

As shown, $NO_x$ is 0.19 to 0.34% near S=1 where temperature is high. These are excessive values. Because excess air lowers temperature, $NO_x$ is 0.08% at S=2 and only 0.01% at S=3. At the latter conditions, reaction between $N_2$ and $O_2$ is slow, so actual $NO_x$ concentration is even less. However, normal burners do not operate stably at such very lean conditions.

The technology of the inventors patents can result in an underoxidized burner replacing the customary near-stoichiometric regions in the first stage of a burner. While the latter produces $NO_x$ that eventually appears in the exhaust, $NO_x$ cannot form in the very fuel rich underoxidized burner. It equilibrates instead to easily combustible CO and $H_2$, and very minor amounts of undecomposed fuel. As a consequence, injecting a mix of such products and the air needed to attain the desired overall air-fuel ration into a second stage burner which incorporates means to achieve the same rapid flow reversals taught by the co-patents, results in rapid chemical equilibration. These factors, aided by the relatively high concentration of $H_2$, permits stable combustion at extraordinarily lean air/fuel ratios with relatively low temperature where $NO_x$ does not form.

The results are first and second stages which are virtually $NO_x$-free, as is the overall combustor, leading to a no-$NO_x$ burner.

Figure 2:
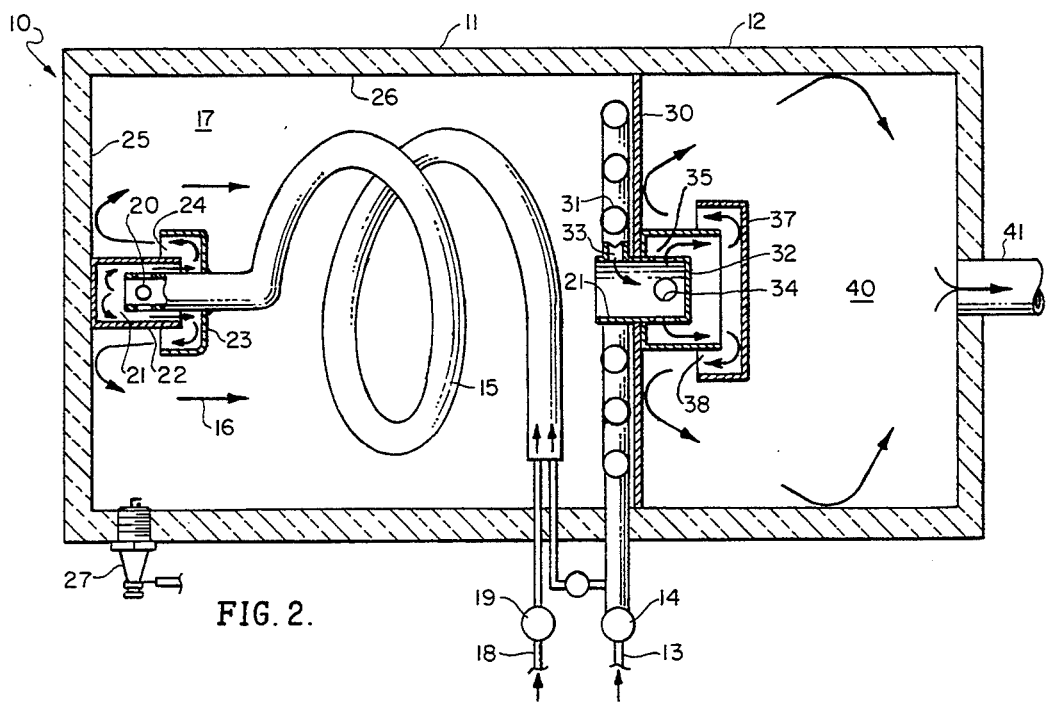
FIG. 2 is an enlarged longitudinal diagrammatic view, in section, illustrating the novel two-stage no=-$NO_x$ burner means employed in an engine for hydrogen generation.

FIG. 2 is an example of a no-$NO_x$ burner incorporating the present invention and is illustrated in the general direction of arrow 10. A burner enclosure 11 is internally covered with an insulation material 12. Air is introduced via an inlet 13 with flow being controlled by a valve 14. A portion of the air controlled by valve 14A passes into a heat exchanger 15 in heat exchange relationship with hot gases 16 within a first stage burner 17. Fuel is introduced to the heat exchanger through an inlet 18 and is passed through a valve 19 into the heat exchanger 15. The pre-heated air/fuel mixture leaves the heat exchanger via a hole 20 and enters an annulus 21 enclosed by a tube 22. The gases pass through the annulus and impinge on the cover of a thimble 23 causing a 90° turn to be taken and eventually, the gases leave the thimble 9 via an orifice 24. The gases then impinge on the insulated rear wall 25 where another 90° turn takes place. The gases are again turned 90° at outward wall 26 and are ignited by a spark plug 27. The burning mixture then moves through the first stage burner 17 to a firewall 30 and exits the first stage chamber via a tube 32. Remaining air from valve 14 moves into a flat tubular heat exchanger 31 in heat exchange relationship with gases 16 and the heated air leaves the exchanger 31 and enters tube 32 via entrance 33. This exchanger may be substituted by a straight tube leading into tube 32. The mixed air and burner products leave the tube 32 via a hole 34 and move into a second annulus 35. The gases now impinge onto the closed end of a thimble 37 where the gases are now turned 90° and leave the thimble via an exit opening 38 to impinge on the firewall where flow is again turned 90°. The gases then move to the cylinder wall 26 in the second chamber or second stage burner 40. The gases finally exit the burner through an orifice 41.

Acceptable formulations for the first and second stage burners can be deduced from FIG. 1. Thus, for the first stage underoxidized burner, S should be above 0.3 to prevent formulation of solid carbon that would interfere with operation of the burner or methane that might be difficult to burn in the second stage and below about 0.6 to prevent formation of $NO_x$. For the second stage, S should be up to 3, preferably at 3 to prevent formation of $NO_x$. The latter ratio includes total air and feed flows to both stages.

Figure 3:
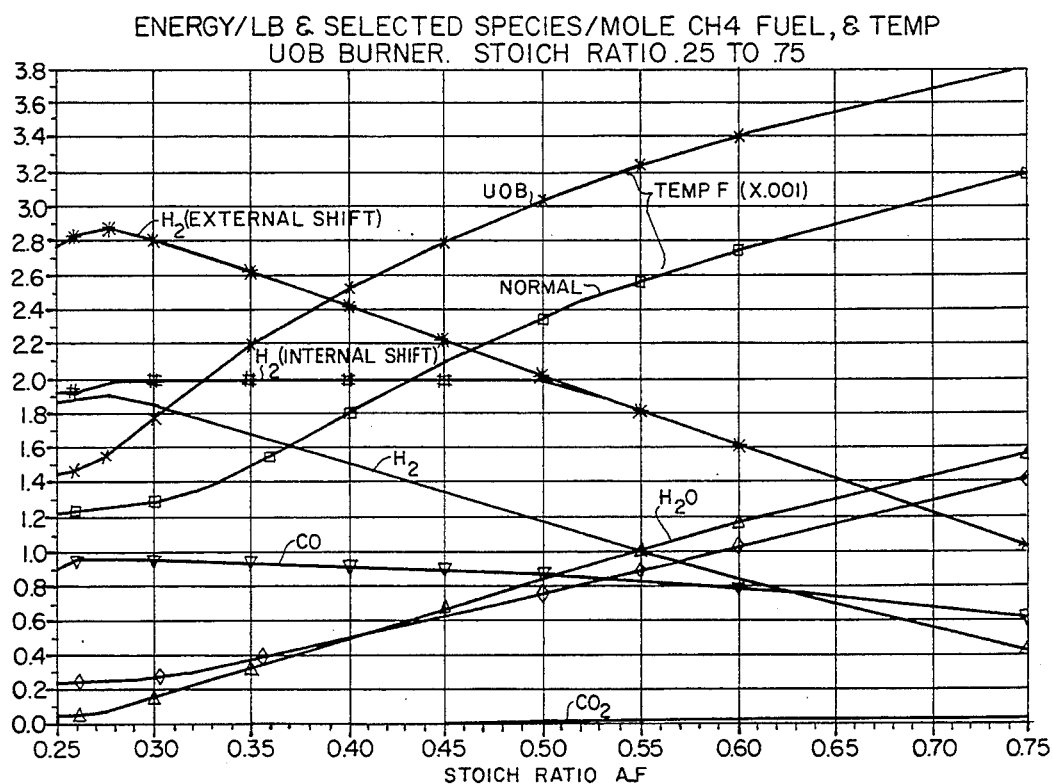
FIG. 3 is a chart illustrating theoretical temperatures and diagrammatic sectional views of the hydrogen generator for fuel/air feed (designated "normal") before and after (designated VOB) heating to 1000° F. employing a pre-heater means using heat exchange principles.

Further means are disclosed to improve the operability and performance of the underoxidized burner while conserving energy through insulating the overall burner, placing the burner section within the feed preheater assembly, locating the feed-mixture flow of the preheater adjacent to the outer insulation and by increasing hydrogen output by effecting reaction between carbon monoxide and water produced by the main reaction or added separately. The previous co-pending disclosures noted above reveal means to improve the underoxidized burner by pre-mixing fuel and air, preheating the fuel/air feed by heat exchange with the burner products, and effecting circulation of the burning products. Additional means for improvement are discussed as follows:

FIG. 3 includes theoretical temperatures for fuel-air feed before and after heating to 1000° F., with increases in the latter case of 600° to 800° F. As indicated in a previous application, the higher temperature greatly increases the likelihood of attaining the theoretical equilibrium needed to provide hydrogen. Attaining such temperatures, however, requires decreasing thermal losses.

A methane burner operating at stoichiometric ratio over unity with $CO_2$ and $H_2O$ as major products provides about 22,000 Btu/lb of methane, with the result that thermal losses in the range of 1000 Btu/lb or more are relatively unimportant and so its combustion temperature can approach its theoretical of 3300° F. where chemical equilibration is likely. On the other hand, much less energy is liberated on reaction of the underoxidized burner because its ideal products are hydrogen and carbon monoxide. Thus, the curve labeled "Btu/lb" in FIG. 3 relates to theoretical heat outputs for methane-air reaction at underoxidized stoichiometric ratios from 0.25 to 0.75. It shows energy output as low as about 500 Btu at the lowest practical ratio of about 0.3 and about 7500 at the upper ratio of about 0.5. At such low energy outputs minor thermal losses become significant.

The curve labeled "normal" in FIG. 3 relates theoretical temperature for feed of 78° F. of underoxidized burners to stoichiometric ratios from 0.25 to 0.75. At the low practical ratio of 0.3, the heat output is easily overshadowed by heat losses, so theoretical temperature is virtually impossible to achieve. Even at the high practical ratio of 0.5, the theoretical temperature of 2300° F. is hard to achieve unless thermal losses are severely decreased.

Figure 4:
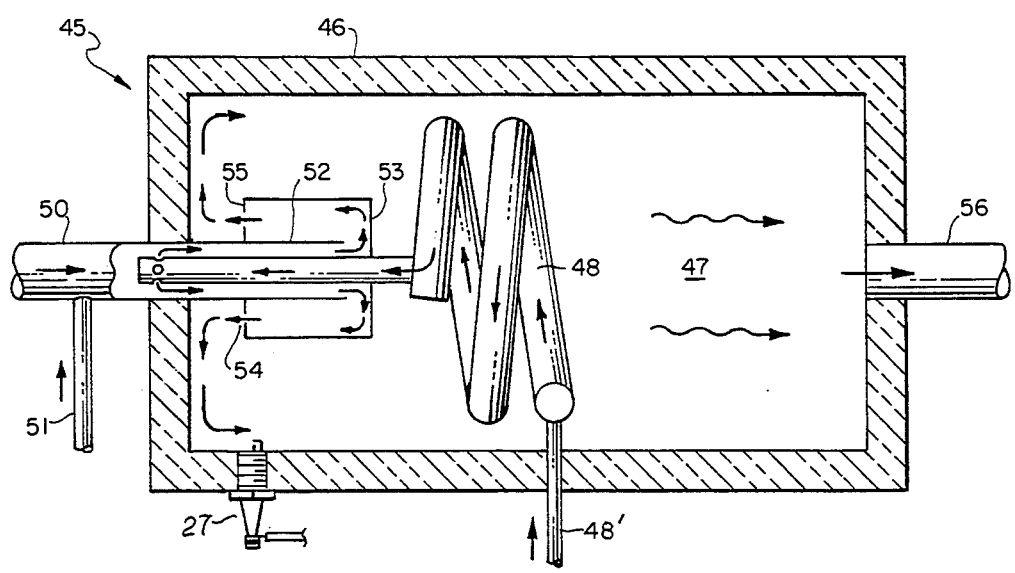
FIG. 4 is a diagrammatic longitudinal cross-sectional view of a prior art single-stage burner.

One means to decrease thermal losses is with insulation. As disclosed in the co-pending applications and as shown in FIG. 4, the burner wall 45 is always composed of material which is insulative to some degree; however, this burner wall still results in heat losses since thermal conductivity is proportional to temperature difference and the insulation contacts the highest temperature of the burner on one side and the lowest external temperature on the other side. Also, the thermal conductivity of most insulation increases with temperature, as indicated in the following Table from Carborundum for Fibrefax Felt.

| Temperature °F. | Conductivity Btu-in/hr-ft$_2$-°F. |
|---|---|
| 500 | .394 |
| 1000 | .643 |
| 1500 | 1.041 |
| 2000 | 1.504 |
| 2500 | 2.572 |
| 3000 | 6.300 |

FIG. 3 also shows theoretical hydrogen formed vs. stoichiometric ratio. Due to formation of water at the lower ratios, hydrogen decreases with increased ratio from a maximum of almost 2 moles/mole of methane. FIG. 3 also shows a more-or-less constant 1 mole of CO per mole of methane is also formed. At low temperature, CO readily reacts with water in a downstream shift reaction to re-form hydrogen through the reaction, $CO+H_2O=H_2+CO_2$, until stoichiometric ratio of 0.5 when all the CO is converted with the result that total hydrogen remains about 2 moles per mole of methane. At the very low ratios, further hydrogen can be formed by adding excess water, as shown in the FIGURE. Such "shift" reactions require cooling, perhaps in a cylinder located downstream from the burner, cooled as by a spiral heat exchanger with air flowing therethrough.

In addition, heat loss is proportional to external areas, and the configuration of FIG. 4 does not minimize this area. The prior art burner is indicated by numeral 45 having a housing 46 with an internal combustion chamber 47. The heat exchanger 48 accepts fuel via inlet 48 and air via inlet 50 with a portion of fuel being introduced via inlet 51. The fuel/air is initially combined in a tube 52 which is open-ended so that the combined fuel/air is directed towards a baffle 53, as indicated by the flow of arrows such that the flow is reversed upon itself and exists through the tube 52 inside a cup 53 where the streams impinge on the baffle 53. Flow direction is changed 90 degrees radially outwardly and then 90 degrees to an opening 54 in a plate 55 into the combustion chamber 47 for exiting via duct 56. Additional disclosure is found in the previously noted co-pending applications.

Figure 5:
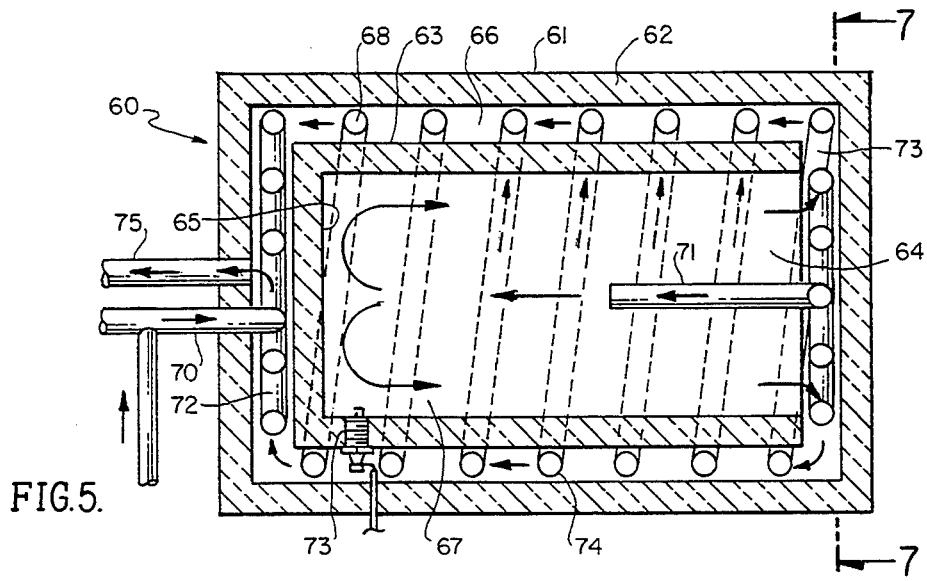
FIG. 5 is a diagrammatic sectional view of another version of a two-stage burner having separate and individually insulated heat exchanger combustion chambers.
Figure 7:
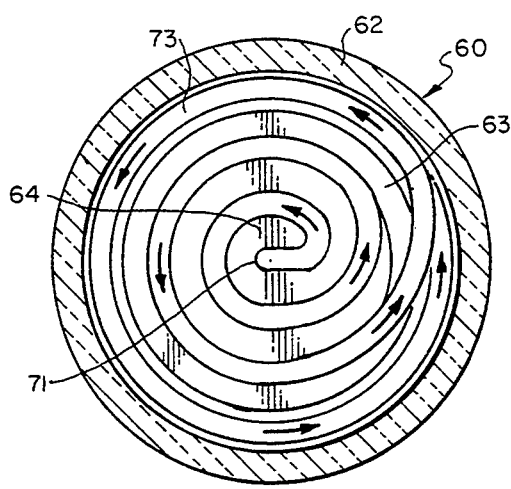
FIG. 7 is a transverse cross-sectional view of the burner shown in FIG. 5 as taken in the direction of arrows 7—7 thereof.

Heat loss can be decreased by locating a burner section within the feed heat exchanger, as indicated in FIG. 5, which tends to "fold" the burner onto itself, to more closely resemble a sphere. Although the embodiment shown in FIG. 2 employs a thicker and more efficient insulation that the prior art, the FIGS. 5 and 7 version as shown in the direction of arrow 60, is more efficient. The burner 60 has an outer section 61 with heavy insulation 62 surrounding an inner section 63 which is hollow and open ended at numeral 64 and closed at a wall 65. A first chamber 66 is defined between the heavily insulated inner section 63 and the outer section 61 while number 67 indicates a second chamber within inner section 63. A spiral heat exchanger 68 containing the feed mixture is disposed in the first chamber 66 and having an inlet 70 and an outlet 71 discharging into the second chamber 64. The air/fuel mixture enters into heat exchanger 68 via an entry coil 72 and passes to an existing coil 73 via an intermediate coil 74 that surrounds the inner section 63. Ignition is achieved by spark plug 73 within second chamber 67 as the preheated air/fuel mixture is discharged from the outlet 71 when the gases impinge against wall 65 and reverse flow direction. Gases then flow from the second chamber 67 through opening 64 into the outer or first chamber 66 for exhaust discharge through exhaust outlet 75.

Therefore, the spiral heat exchanger 68 containing the feed mixture is surrounded by high temperature gases from the burner chamber 67. These hot gases contact the inner surface of the insulating wall of the outer section 61 while the outer surface is in contact with the cool exterior. As a result, the temperature drop across the insulation is high which causes a considerable swing in heat flux values.

Figure 6:
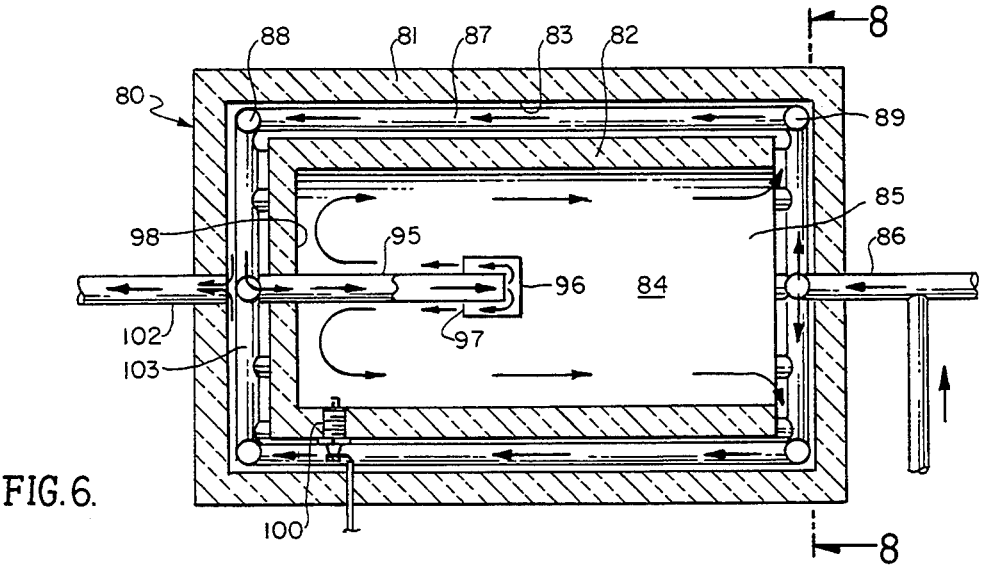
FIG. 6 is a view similar to the burner shown in FIG. 5 showing a modified heat exchanger.
Figure 8:
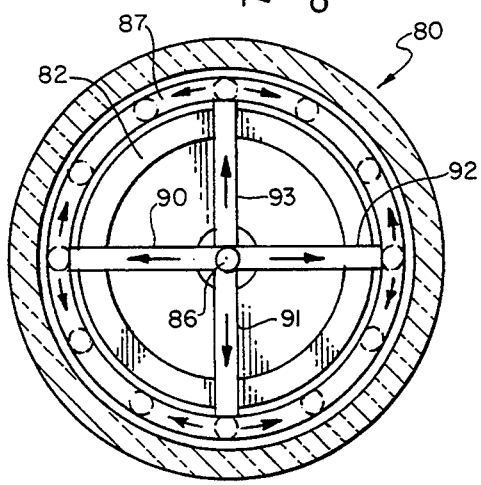
FIG. 8 is a transverse sectional view taken in the direction of arrows 8—8 in FIG. 6.

The embodiment of FIGS. 6 and 8 discloses a heat exchanger section which greatly reduces or decreases the heat flux swing values. The burner device is illustrated in the direction of arrow 80 which includes an outer section 81 and an inner section 82, both of which are composed of insulated walls and arranged in coaxial spaced apart relationship defining a first chamber 83 and internal burner chamber 84 which is open at end 85. An inlet 86 brings air/fuel supply to a heat exchanger 87 consisting of a plurality of spaced apart parallel tubes coaxial with the burner and having opposites joined in annular tubes 88 and 89. Tubular spokes 90-94 connect the heat exchanger parallel tubes with inlet 86 while similar tubular spokes 103 connect the other end of the parallel tubes with a feed tube 95. The end of the tube 95 supports a baffle or cup 96 having an end wall against the feed mixture impinges which reverses the flow and then exits into the burner chamber 84. The flow impacts against end wall 98 which causes another directional flow reversal. Ignition is achieved by spark plug 100 and the exhaust flow exits through opening 85 into the first chamber 83 partially occupied by the heat exchanger 87. Discharge of the gases is via exhaust exit 102 connected to the first chamber after the gases flow past the heat exchanger. The heat exchanger forms an outer and an inner annulus. The outer contains the cooled feed mixture and is located adjacent to the outer wall of insulation. Then, the overall heat loss from one burner proportions to the difference between the feed mixture and environment temperature, instead of the much larger difference between the burner output gases and the environment. Also, as noted above, because the conductivity of normal high temperature insulations increases with temperature, the heat loss to the environment is less than it would be if higher temperature burner gases were adjacent to the external insulation.

For thermal passage through cylindrical insulation surrounding the burner with conductivity as given in the above table with ID of 7 inches, OD of 10 inches and height of 7 inches and burner gases averaging 2100 degrees F., feed gases 900 degrees F., and ambient at 78 degrees F., the heat flux is 790 Btu/hr for a normal heat exchanger and only a heat flux of 136 with the inventive burner, which is a reduction to 30%.

Figure 9:
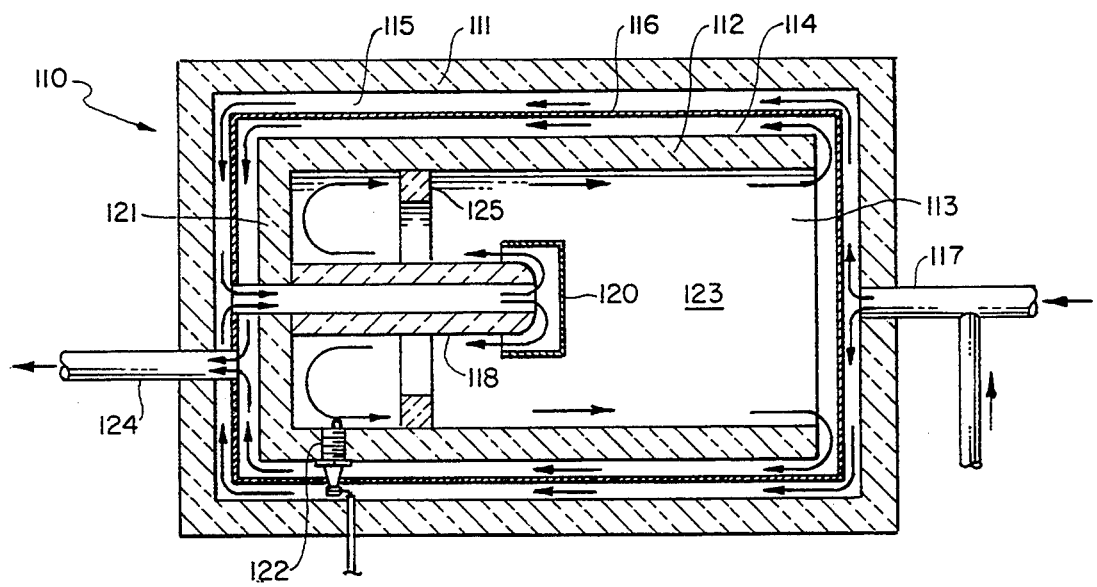
FIG. 9 is a view similar to the burner shown in FIG. 6 showing a preferred modified heat exchanger and also illustrating a ceramic or cement insulation ring between heat exchanger and burner rear.
Figure 10:
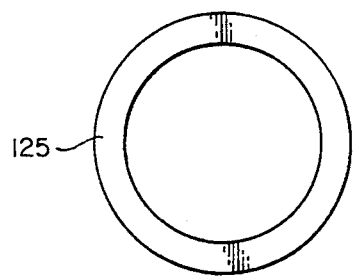
FIG. 10 is a side elevational view of the ceramic ring disassembled from the burner shown in FIG. 9.

Referring now to FIG. 9, another burner version is illustrated in the general direction of arrow 110 which, as previously described, includes an insulated outer wall 111 coaxially disposed with respect to an inner section 112 having an opening 113 in fluid communication with a closed inner chamber 114. An outer chamber 115 is separated therefrom by a "can" like metal separator 116. The outer chamber is in communication with an inlet 117 for conducting air/fuel mixture to a fully insulated injector-mixer 118 which includes a baffle plate or cup 120 for effecting feed mixture flow reversal as previously described. A wall 121 of the inner section 112 causes another flow reversal. Spark plug 122 ignites the gases in a burner chamber 123 for exiting through inner chamber 114 to an exhaust outlet 124.

Feed gases enter the burner 110 through inlet 117 and move radially through space or outer chamber 115. The gases move against the insulated wall 111 within the annulus and then pass radially inward along the chamber 115 to the injector-mixer 118. The hot gases formed in the burner chamber 123 impinge on the inner surface of the separator 116 and then pass radially outward to an annulus bounded by the separator and the insulated inner section 112. Finally the gases exit at outlet 124.

The separator is the exchanger surface between burner gas and feed gases. Its area is sufficiently large so that there is no requirement for any "extended" surfaces. Flows are parallel, instead of counter flow, to limit heat exchange and prevent uncontrolled temperature caused by any conventional "boot strap" process. This is not a requirement and counter flow may also be used.

The inventive burner concept may be employed with diesel fuel in diesel-type engines.

A major problem with such engines are particulates (smoke) ejected from the tail pipe, which include toxic material and provide a visual and auditory nuisance. Such particulates could be eliminated by using the first section of the inventive burner to gasify all the diesel fuel prior to injection into the engine, along with the further air necessary to get the final air fuel ratio. By doing so, the diesel fuel cannot produce particulates. The process would also result in the ability of the engine burner to operate at low air/fuel ratios where $NO_x$ does not form.

The several impingements of the air/fuel mixture result in an intimate mixture that readily ignites and burns to completion in a certain volume. This volume may be decreased by about 25% by placing a preferably ceramic ring 125 within the burner below the location where the fuel stream leaves the mixer, as shown in FIG. 9. Apparently the ring causes the burning gases to move from the sides of the burner and into its center, after which a portion spontaneously moves back to the wall, and so results in more complete utilization of the burner volume.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an internal combustion apparatus, the improvement which comprises:
   a burner means having a pair of combustion chambers for combusting air and hydrocarbons at fuel-rich stoichiometric air/fuel ratios from 0.3 to 1.0 to provide air/fuel vapors;
   each combustion chamber includes a mixer means intimately combining said air/fuel vapors for injection into said internal combustion apparatus;
   said burner means having an inlet means communicating with each combustion chamber of said pair for receiving a supply of fuel and air;
   a pre-heater means connected with each of said inlet means for heating the supply of fuel and air;
   means for supplying fuel and air to one of said pre-heater means and air to another of said pre-heater means;
   said mixer means in each of said burner means combustion chambers includes a baffle wall; means for directing fuel and air from one of said pre-heater means at one of said baffle walls; means for directing air from said other pre-heater means in combination with gases from a first of said combustion chambers into said inlet of said other walls; of said combustion chambers and at another of said baffle walls; said baffle wall of each of said mixer means including wall means for reversing the flow of air, fuel or gases directed at said baffle walls; and said other of said combustion chambers including an outlet for the discharge of gases.

2. The invention as defined in claim 1 wherein:
   each of said pre-heater means includes a tubular coil for receiving and mixing said first air/fuel supply; and said second air supply respectively
   said pre-heater means constitutes a heat exchanger employing combusted gases in a first of said combustion chambers to be conducted adjacent said tubular coils associated with said first combustion chamber to raise the temperature of said air/fuel mixture and air preparatory to entering the internal combustion apparatus.

3. The invention as defined in claim 2 wherein:
   said means for directing includes an exit tube opening immediately adjacent to each said baffle wall.

4. The invention as defined in claim 3 wherein:
   each coil is of sufficient length so that the internal air/fuel mixture is heated within the range of 500° to 1000° F.

5. The invention as defined in claim 4 wherein:
   said pair of combustion chambers are disposed with respect to each other lying along a common longitudinal axis in end-to-end relationship.

6. The invention as defined in claim 1 including:
   each of said combustion chambers enclosed by an insulated layer separating said combustion chambers from ambient atmosphere.

7. The invention as defined in claim 6 wherein:
   said combustion chambers are arranged in end-to-end relationship and separated by a firewall.

* * * * *